(12) United States Patent
Agarwal et al.

(10) Patent No.: US 12,661,780 B2
(45) Date of Patent: Jun. 23, 2026

(54) OPERATION CONTROL METHOD, OPERATION CONTROL DEVICE, AND STORAGE MEDIUM

(71) Applicant: HONDA MOTOR CO., LTD., Tokyo (JP)

(72) Inventors: Rishi Agarwal, Wako (JP); Tadaaki Hasegawa, Wako (JP); Hirofumi Shin, Wako (JP); Yohei Kitahara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 182 days.

(21) Appl. No.: 18/583,929

(22) Filed: Feb. 22, 2024

(65) Prior Publication Data

US 2024/0300095 A1    Sep. 12, 2024

(30) Foreign Application Priority Data

Mar. 7, 2023    (JP) ................................. 2023-034596

(51) Int. Cl.
| | |
|---|---|
| *B25J 15/00* | (2006.01) |
| *B25J 9/16* | (2006.01) |
| *B25J 13/02* | (2006.01) |
| *B25J 13/08* | (2006.01) |

(52) U.S. Cl.
CPC ............. *B25J 9/1612* (2013.01); *B25J 9/161* (2013.01); *B25J 9/163* (2013.01); *B25J 9/1633* (2013.01); *B25J 9/1689* (2013.01); *B25J 13/02* (2013.01); *B25J 13/082* (2013.01); *B25J 13/085* (2013.01); *B25J 15/0009* (2013.01)

(58) Field of Classification Search
CPC . B25J 9/1612; B25J 9/161; B25J 9/163; B25J 9/1633; B25J 9/1689; B25J 13/02; B25J 13/082; B25J 13/085; B25J 15/0009
USPC .......................................................... 700/260
See application file for complete search history.

(56) References Cited

U.S. PATENT DOCUMENTS

| | | | | |
|---|---|---|---|---|
| 8,504,205 | B2 * | 8/2013 | Summer ................ | B25J 13/085 |
| | | | | 901/34 |
| 12,246,448 | B2 * | 3/2025 | Tang ...................... | B25J 13/089 |
| 2005/0106536 | A1 * | 5/2005 | Liebermann ........... | G09B 21/04 |
| | | | | 434/112 |
| 2012/0239195 | A1 * | 9/2012 | Summer .................. | B25J 5/005 |
| | | | | 901/46 |
| 2013/0325181 | A1 * | 12/2013 | Moore ................... | B25J 13/086 |
| | | | | 901/31 |
| 2019/0001508 | A1 * | 1/2019 | Li .......................... | B25J 9/1612 |
| 2022/0193906 | A1 * | 6/2022 | Barry ..................... | B25J 9/1664 |
| 2022/0314439 | A1 * | 10/2022 | Tang ...................... | B25J 13/084 |

(Continued)

FOREIGN PATENT DOCUMENTS

JP          2011-110620          6/2011

*Primary Examiner* — B M M Hannan
(74) *Attorney, Agent, or Firm* — Amin, Turocy & Watson, LLP

(57) ABSTRACT

An operation control method according to an embodiment includes: acquiring sensor data generated when an operator remotely operates an end effector that is able to grasp or operate an object and in which a plurality of fingers are disposed; determining the role of each of the plurality of fingers on the basis of the sensor data; and generating a command for operating the end effector on the basis of the determined role of each of the plurality of fingers and the sensor data.

8 Claims, 6 Drawing Sheets

(56) References Cited

U.S. PATENT DOCUMENTS

2023/0241767 A1*   8/2023   Sodeyama ............. B25J 9/1633
                                                          700/260
2023/0294278 A1*   9/2023   Ishige ................... B25J 13/081
2025/0018564 A1*   1/2025   Yamagishi .............. B25J 13/08
2025/0296235 A1*   9/2025   Taylor .................. B25J 9/1694

* cited by examiner

START

S100
ACQUIRE SENSOR DATA

S102
DETERMINE ROLE OF EACH
FINGER USING PRIMARY MODEL

S104
RE-DETERMINE ROLE OF EACH
FINGER USING SECONDARY MODEL

S106
GENERATE COMMAND

S108
OUTPUT COMMAND

END

OPERATION CONTROL METHOD, OPERATION CONTROL DEVICE, AND STORAGE MEDIUM

CROSS-REFERENCE TO RELATED APPLICATION

This application is based upon and claims the benefit of priority from Japanese Patent Application No. 2023-034596, filed Mar. 7, 2023, the entire contents of which is incorporated herein by reference.

BACKGROUND

Field of the Invention

The present invention relates to an operation control method, an operation control device, and a storage medium.

Description of Related Art

In order to cause a robot to reproduce the same operation as that of an operator, it is a very important operation to determine the intention of the operator remotely operating the robot. Many methods and attempts have been considered for detecting an object to be achieved by an operator.

For example, one known method involves applying information of a joint angle of each finger and the like of an operator acquired from a sensor to a robot in a case in which the robot is to be caused to grasp an object in a remote operation (for example, see Japanese Unexamined Patent Publication No. 2011-110620).

SUMMARY

However, in a conventional technology, since human hands have complex properties and there are very diverse tasks that can be achieved using human hands, there are cases in which it is difficult to cause a robot to reproduce the same operation as that of an operator.

The present invention is in view of such situations, and one object thereof is to provide an operation control method, an operation control device, and a storage medium capable of causing a robot to reproduce very diverse tasks that can be achieved using human hands.

An operation control method, an operation control device, and a storage medium according to the present invention employ the following configurations.

(1) A first example of the present invention is an operation control method for an end effector using a computer. The operation control method includes: acquiring sensor data generated when an operator remotely operates an end effector that is able to grasp or operate an object and in which a plurality of fingers are disposed; determining the role of each of the plurality of fingers on the basis of the sensor data; and generating a command for operating the end effector on the basis of the role of each of the plurality of fingers and the sensor data.

(2) According to a second example of the present invention, in the first example, the roles include: a first role of grasping the object using a target finger together with the other fingers; a second role of operating the object with a balance of forces of the target finger and the other fingers maintained; a third role of operating the object by applying a force to the object, which is grasped with a balance of forces maintained using the other fingers, using the target finger; and a fourth role of not applying a force to the object using the target finger.

(3) According to a third example of the present invention, in the second example, a value representing a joint angle of each finger of the operator and a value representing presence/absence of contact of the object with the end effector are included in the sensor data, and in a case in which the joint angle of a first finger of interest among fingers of the operator is equal to or larger than a first threshold, and the object is not brought into contact with the end effector, the role of the finger of the end effector corresponding to the first finger of a hand of the operator is determined to be the fourth role, and in a case in which the joint angle of the first finger is smaller than the first threshold, and the object is brought into contact with the end effector, the role of the finger of the end effector corresponding to the first finger of the hand of the operator is determined to be the first role, the second role, or the third role.

(4) According to a fourth example of the present invention, in the third example, in a case in which a change of the joint angle of the first finger is smaller than a second threshold, the role of the finger of the end effector that corresponds to the first finger of the hand of the operator is determined to be the first role, in a case in which a change of the joint angle of the first finger is equal to or larger than the second threshold, and a relative change between the joint angle of a second finger different from the first finger and the joint angle of the first finger is smaller than a third threshold, the role of the finger of the end effector that corresponds to the first finger of the hand of the operator is determined to be the second role, and in a case in which a change of the joint angle of the first finger is equal to or larger than the second threshold, and a relative change between the joint angle of the second finger and the joint angle of the first finger is equal to or larger than the third threshold, the role of the finger of the end effector that corresponds to the first finger of the hand of the operator is determined to be the third role.

(5) According to a fifth example of the present invention, in the first or second example, the role of each of the plurality of fingers is determined from the sensor data using a machine learning model.

(6) According to a sixth example of the present invention, in the first or second example, an operation of the entire end effector is determined from the role of each of the plurality of fingers and the sensor data using a machine learning model, and the command is generated on the basis of the determined operation of the entire end effector.

(7) A seventh example of the present invention is an operation control device including: an acquisition unit acquiring sensor data generated when an operator remotely operates an end effector that is able to grasp or operate an object and in which a plurality of fingers are disposed; a determination unit determining the role of each of the plurality of fingers on the basis of the sensor data; and a generation unit generating a command for operating the end effector on the basis of the role of each of the plurality of fingers and the sensor data.

(8) An eighth example of the present invention is a non-transitory storage medium storing commands, which are computer-readable commands to be executed by a computer, including: acquiring sensor data generated when an operator remotely operates an end effector that is able to grasp or operate an object and in which a plurality of fingers are disposed; determining the role of each of the plurality of fingers on the basis of the sensor data; and generating a command for operating the end effector on the basis of the role of each of the plurality of fingers and the sensor data.

According to the examples described above, a robot can be caused to reproduce very diverse tasks that can be achieved using human hands.

BRIEF DESCRIPTION OF THE DRAWINGS

FIG. 3 is a diagram showing an overview of a method for determining the role of each finger of an end effector according to an embodiment.

DESCRIPTION OF EMBODIMENTS

Hereinafter, an operation control method, an operation control device, and a storage medium according to an embodiment of the present invention will be described with reference to the drawings.
(Overview)

This embodiment supports causing a robot that is remotely operated by an operator to perform the same operation as that of the operator. Although a robot is typically a human-type robot (a humanoid robot) that is able to grasp or operate an object OB using an end effector 10, it is not limited thereto and may be a robot of any form as long as it can grasp or operate an object OB. For example, the robot may be a robot of a quadrupedal animal type, an industrial robot, a military robot, or a home robot (for example, a cleaning robot or the like) or may be one of various other robots.
(Configuration of End Effector)

Figure 1:
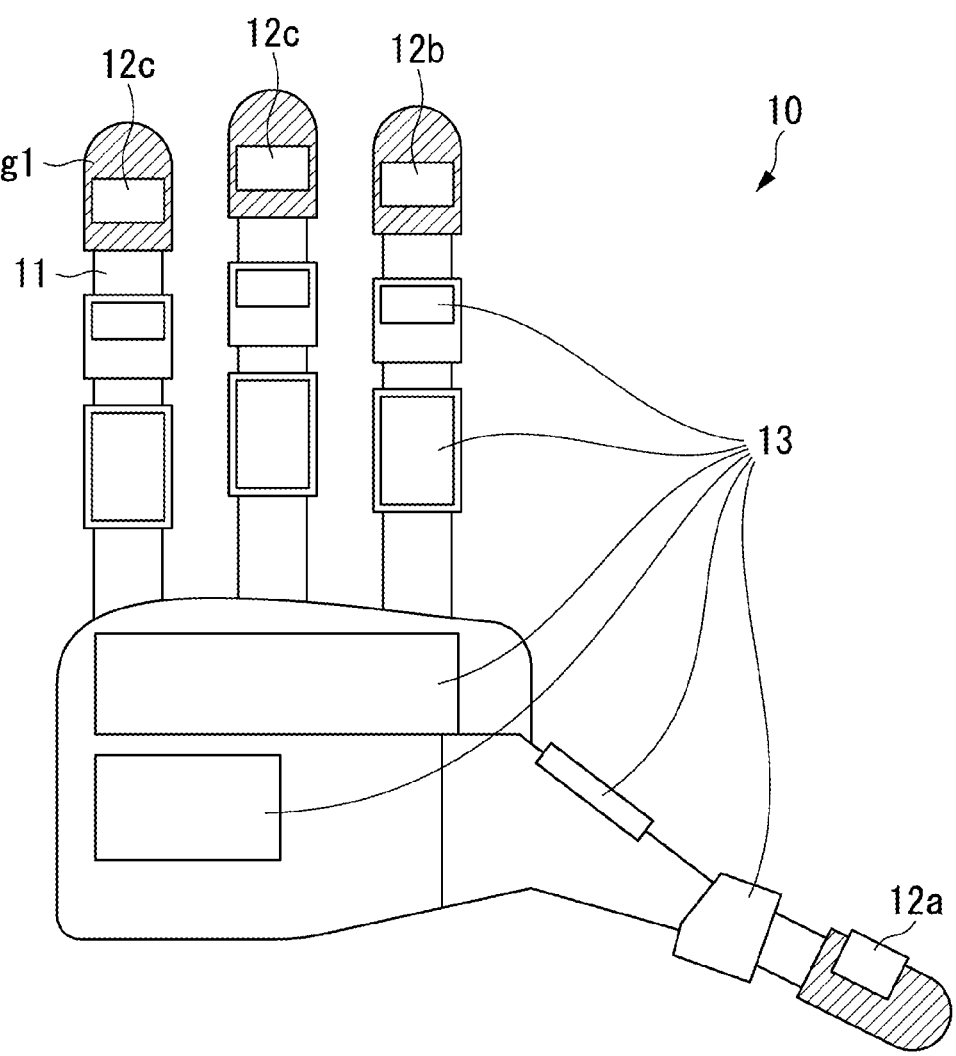
FIG. 1 is a diagram illustrating an example of the configuration of an end effector according to an embodiment.

FIG. 1 is a diagram illustrating an example of the configuration of an end effector 10 according to an embodiment. As illustrated in the drawing, in the end effector 10, for example, several fingers 11 are disposed as grippers. The end effector 10 is also referred to as a robot hand. For this reason, in the following description, the end effector 10 may also simply be described as a "hand." The number of fingers 11 is not limited to four and, for example, may be two or three or five or more.

At tip ends of the fingers 11, for example, force sensors 12 (12a, 12b, 12c, and 12d) that are 6-axis sensors are attached. At fingertips, a palm of the hand, and the like, tactile sensors 13 are attached. Furthermore, at tip ends of the fingers 11, rubbers g1 are attached. The rubbers g1 may have shapes (for example, protrusions) that generate a friction force with respect to an object OB.
(Configuration of Operation Control Device)

Figure 2:
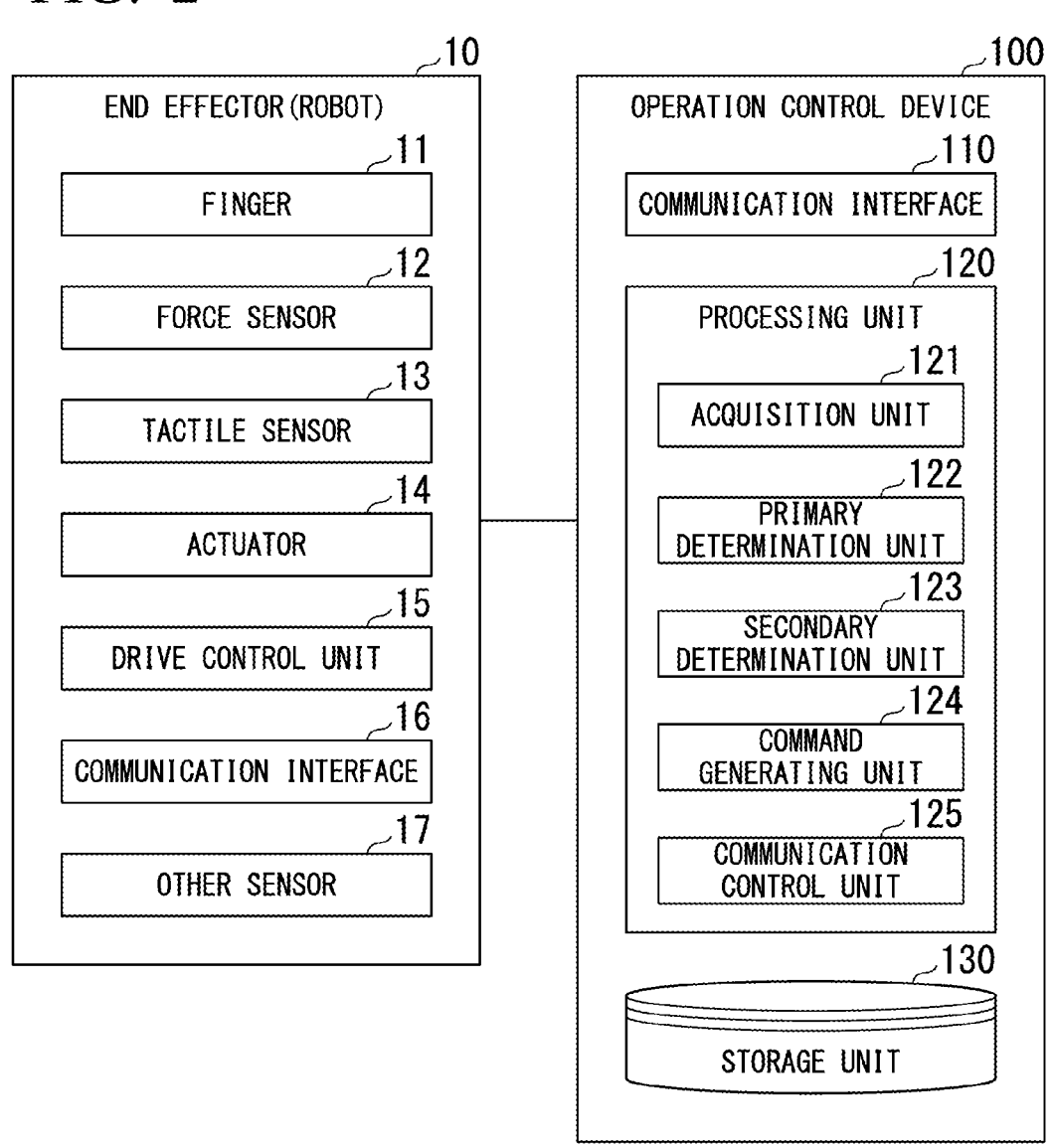
FIG. 2 is a configuration diagram of an end effector and an operation control device according to an embodiment.

FIG. 2 is a configuration diagram of an end effector 10 and an operation control device 100 according to an embodiment. In addition to the finger 11, the force sensor 12, and the tactile sensor 13 described above, the end effector 10 further includes an actuator 14, a drive control unit 15, a communication interface 16, and another sensor 17.

The force sensor 12, for example, may be a pressure sensor or may be a 6-axis force sensor (6 AF sensor) that can measure magnitudes of forces and torques applied in a plurality of directions in real time. For example, the force sensor 12 measures magnitudes of a force of each axis and a moment of the force, a joint angle, and the like.

The tactile sensor 13, for example, is a tactile sensor that detects information sensed by tactile included in hands and the like of a human and converts the information into an electric signal. The tactile sensor 13 detects presence/absence of contact with an object OB. In addition, detection of a contact position between an object and the finger 11 may be performed using a known contact position detection algorithm using a detection value detected by the 6-axis sensor.

The actuator 14 receives control from the drive control unit 15 and drives each joint of the end effector 10 of the robot. The actuator 14, for example, includes an electromagnetic motor, a gear, an artificial muscle.

The drive control unit 15 controls the actuator 14 on the basis of a control command generated by the operation control device 100.

The communication interface 16 transmits sensor data of each of the force sensor 12, the tactile sensor 13, and the other sensor 17 to the operation control device 100 in a wired or wireless manner. In addition, the communication interface 16 receives various kinds of information from the operation control device 100. For example, the communication interface 16 includes a radio communication module including a receiver and a transmitter, a network interface card (NIC), and the like.

The other sensor 17, for example, is a camera, a motion capture sensor, and the like. These sensors, for example, are installed in a part (typically, a head part) of a body of the robot. The camera, for example, is a depth camera (a 3D camera). For example, the camera captures a scene of an object OB being grasped or operated by the end effector and transmits image data acquired by capturing the scene to the operation control device 100 through the communication interface 16.

The operation control device 100, for example, includes a communication interface 110, a processing unit 120, and a storage unit 130.

The communication interface 110 communicates with an external device through a network NW and communicates with the end effector 10 through a communication line such as a bus. The communication interface 110, for example, includes a radio communication module including a receiver and a transmitter, a network interface card (NIC), and the like.

An external device, for example, is an input device of a glove type worn by the hand of an operator who remotely operates the robot from a remote place. In the input device of the glove type, for example, similar to the end effector 10, force sensors that are 6-axis sensors are attached to tip ends of the fingers, and tactile sensors are attached to the fingertips and the palm of the hand. Furthermore, an angle sensor, a rotary encoder, and the like detecting joint angles of fingers of an operator are attached to the input device of the glove type. By using sensor data of these sensors of the input device of the glove type, the end effector 10 is caused to reproduce movement of a hand of an operator.

The processing unit 120, for example, includes an acquisition unit 121, a primary determination unit 122, a secondary determination unit 123, a command generating unit 124, and a communication control unit 125.

Constituent elements of the processing unit 120, for example, are realized by a central processing unit (CPU), a graphics processing unit (GPU), or the like executing a program or instructions stored in the storage unit 130. Some or all of such constituent elements may be realized by hardware such as a large-scale integration (LSI), an application specific integrated circuit (ASIC), a field-programmable gate array (FPGA), or the like or may be realized by software and hardware in cooperation.

The storage unit 130, for example, is realized by a hard disc drive (HDD), a flash memory, an electrically erasable programmable read only memory (EEPROM), a read only memory (ROM), a random-access memory (RAM), or the like. The storage unit 130, stores firmware, an application program, arithmetic operation results of the processing unit 120 and the like.

The acquisition unit 121 acquires sensor data of each of the force sensor 12, the tactile sensor 13, and the other sensor 17 from the end effector 10 through the communication interface 110. Furthermore, the acquisition unit 121 acquires sensor data of each sensor from the input device of the glove type worn by the hand of an operator through the communication interface 110.

The primary determination unit 122 determines a role of each finger 11 of the end effector 10 on the basis of sensor data acquired by the acquisition unit 121.

Figure 3:
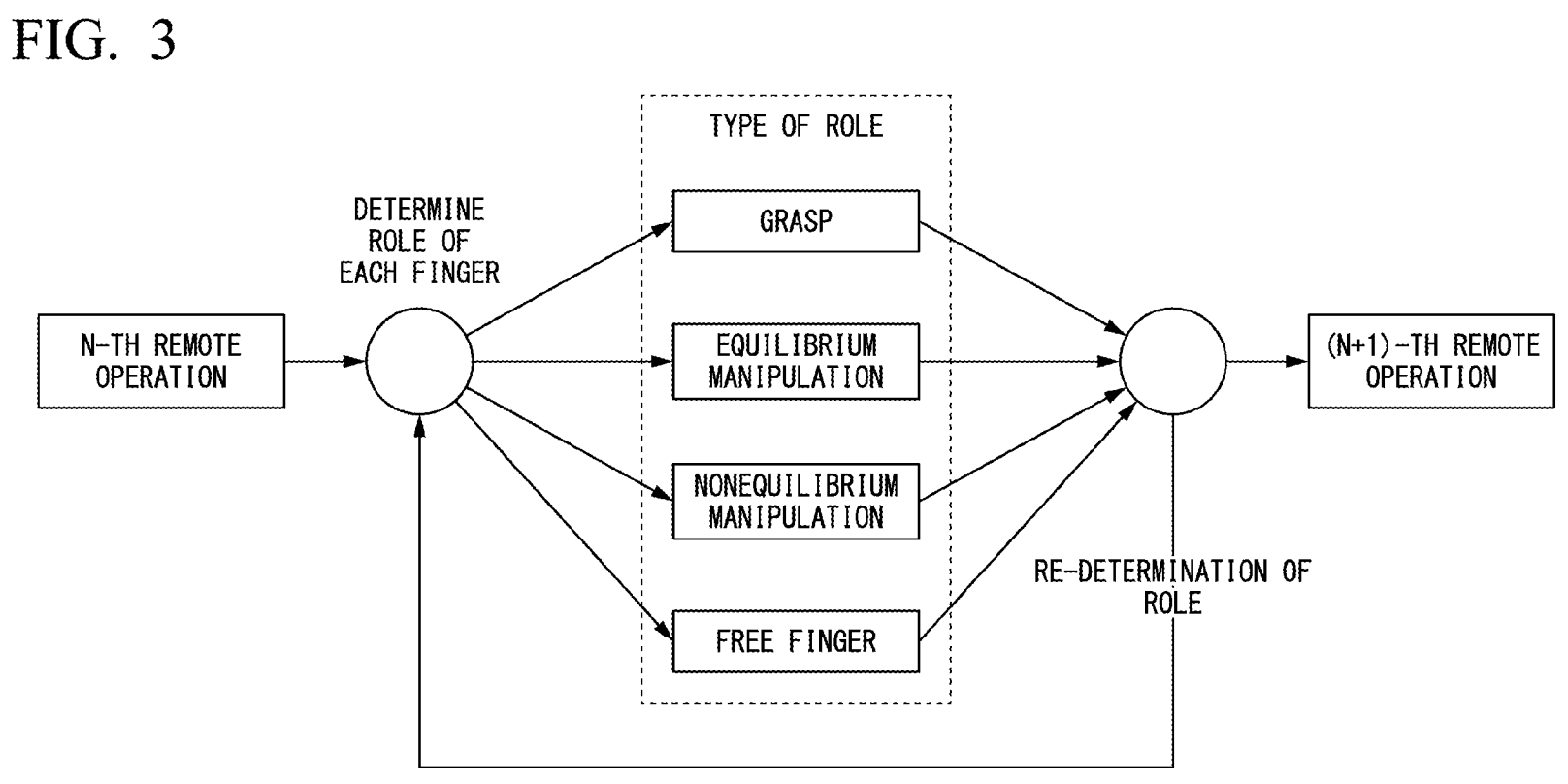
Figure 4:
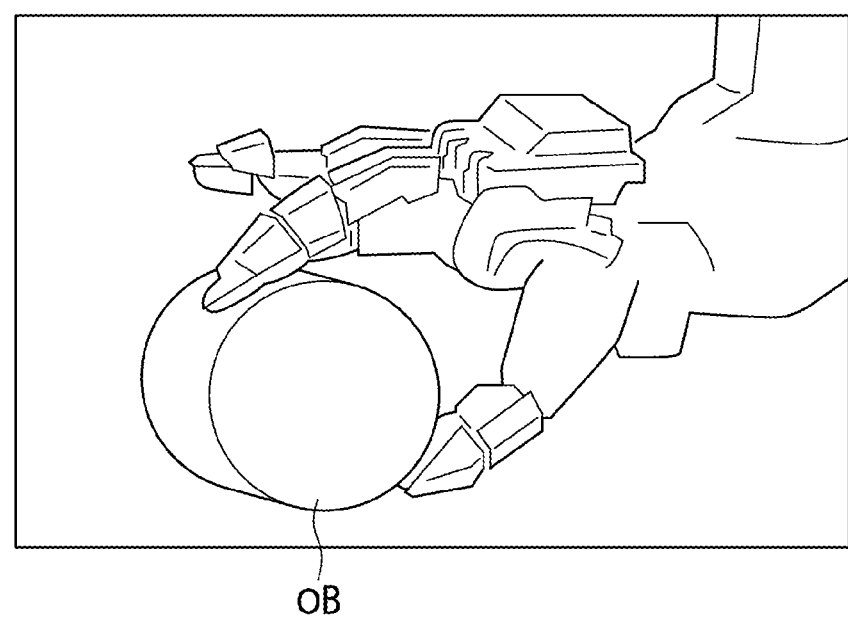
FIG. 4 is a diagram showing a role of each finger of an end effector according to an embodiment.
Figure 5:
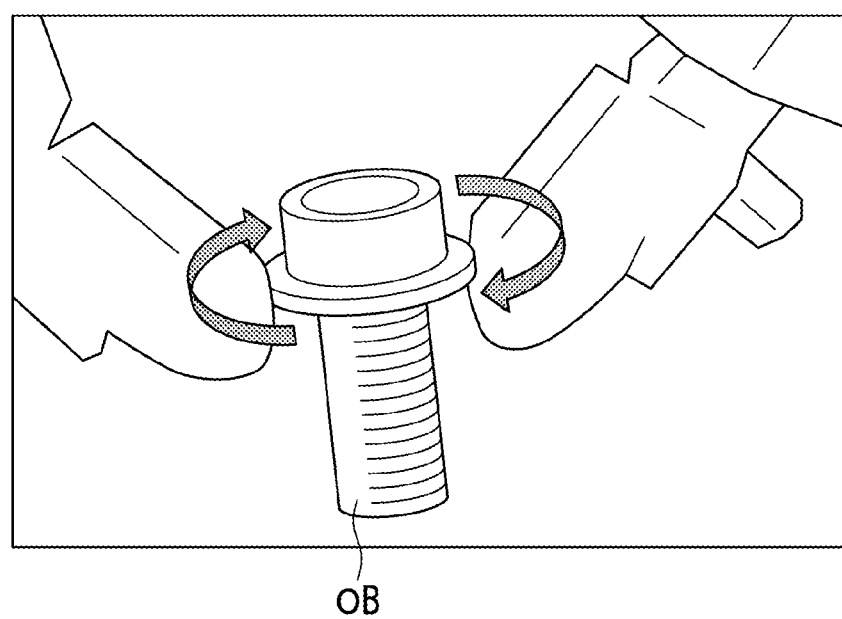
FIG. 5 is a diagram showing a role of each finger of an end effector according to an embodiment.
Figure 6:
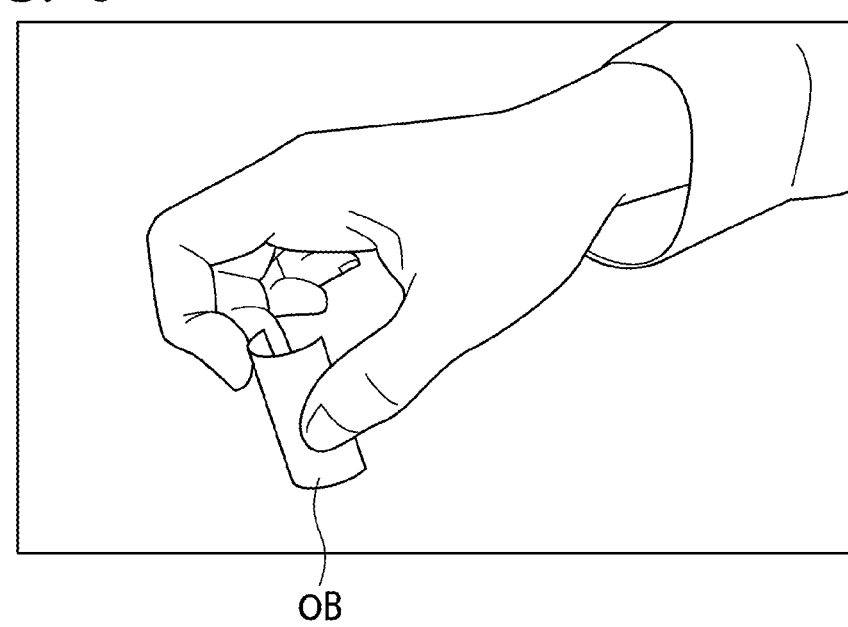
FIG. 6 is a diagram showing a role of each finger of an end effector according to an embodiment.

FIG. 3 is a diagram showing an overview of a method for determining the role of each finger 11 of the end effector 10 according to the embodiment. FIGS. 4 to 6 are diagrams showing a role of each finger 11 of the end effector 10 according to the embodiment. As illustrated in FIG. 3, at the time of performing an N-th (here, N is an arbitrary natural number) remote operation, sensor data (sensor data including a joint angle, a force of each axis, a magnitude of a moment of a force, and the like) is acquired from each sensor of the input device of the glove type worn by the hand of an operator, and furthermore, sensor data representing presence/absence of contact with an object OB is acquired from the tactile sensor 13 of the end effector 10.

The primary determination unit 122 determines a role of each finger 11 of the end effector 10 on the basis of the joint angle of the hand of the operator, the force of each axis, the magnitude of the moment of the force, and presence/absence of contact with the object OB onto the end effector 10.

As the role, for example, "grasp", "equilibrium manipulation", "nonequilibrium manipulation", and "free finger" are included. The grasp is an example of "first role", the equilibrium manipulation is an example of "second role", the nonequilibrium manipulation is an example of "third role", and the free finger is an example of "fourth role".

The grasp, as illustrated in FIG. 4, is a role of a finger 11 that is a determination target among a plurality of fingers 11 disposed in the end effector 10 grasping an object OB together with other fingers 11.

The equilibrium manipulation, as illustrated in FIG. 5, is a role of a finger 11 that is a determination target among the plurality of fingers 11 disposed in the end effector 10 operating an object OB with a balance with forces of other fingers 11 maintained. More specifically, the equilibrium manipulation is a role of performing a rotational motion or a translational motion of an object OB with catching hold of the object OB.

The nonequilibrium manipulation, as illustrated in FIG. 6, is a role of operating an object OB by applying a force to the object OB, which is grasped with a balance of forces maintained by other fingers 11 among a plurality of fingers 11 disposed in the end effector 10, using a finger 11 that is a determination target. More specifically, the nonequilibrium manipulation is a role of separating only the finger 11 that is the determination target with an object OB caught hold and performing a rotational motion or a translational motion of the object OB using the separated finger 11.

The free finger is a role of separating a finger 11 that is a determination target among a plurality of fingers 11 disposed in the end effector 10 from an object OB and not applying a force to the object OB using the separated finger 11.

The secondary determination unit 123 re-determines the role of each finger 11 of the end effector 10 on the basis of the role of each finger 11 of the end effector 10 determined by the primary determination unit 122 and sensor data acquired by the acquisition unit 121.

The command generating unit 124 generates a control command for controlling each actuator 14 of the end effector 10 on the basis of the role of each finger 11 of the end effector 10 determined by the secondary determination unit 123.

The communication control unit 125 transmits a control command generated by the command generating unit 124 to the end effector 10 through the communication interface 110. When the control command is received from the operation control device 100, the drive control unit 15 of the end effector 10 controls the actuator 14 on the basis of the control command. In accordance with this, the end effector 10 operates, and a task of grasping or operating the object OB is performed.

(Process Flow of Operation Control Device)

Figure 7:
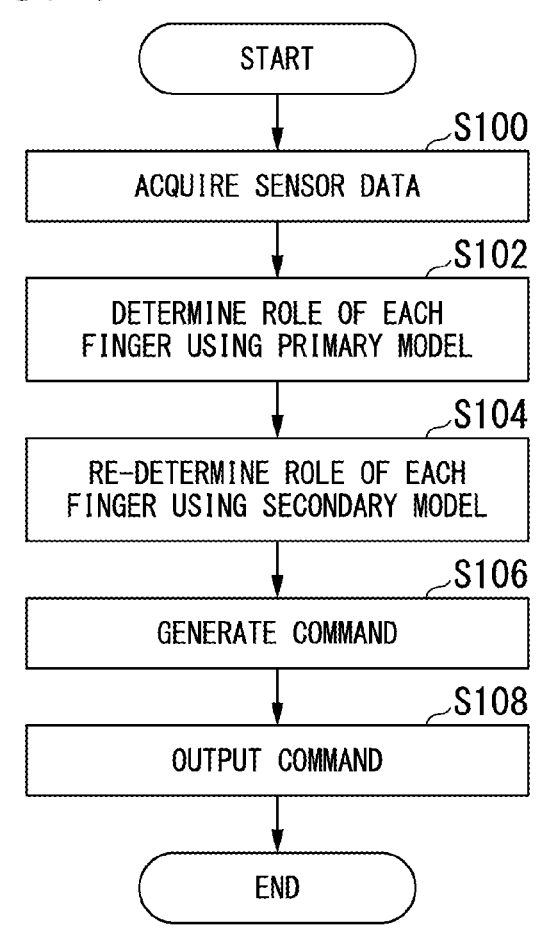
FIG. 7 is a flowchart illustrating the flow of a training process of a processing unit according to an embodiment.

Hereinafter, each constituent element of the processing unit 120 of the operation control device 100 will be described using a flowchart. FIG. 7 is a flowchart illustrating the flow of a training process of the processing unit 120 according to the embodiment.

First, the acquisition unit 121 acquires sensor data of various sensors from the end effector 10 through the communication interface 110 and acquires sensor data of various sensors from an input device of a glove type worn by the hand of an operator (Step S100).

Next, the primary determination unit 122 determines the role of each finger 11 of the end effector 10 from sensor data of the force sensor acquired from the input device of the glove type (that is, a joint angle of the finger of the operator) and sensor data of the tactile sensor 13 (that is, presence/absence of contact with the object OB onto the end effector 10) from the end effector 10 using a primary model MDL1 (Step S102). The primary determination unit 122 may determine the role of each finger 11 of the end effector 10 further using sensor data of another sensor 17 (a camera or a motion capture sensor) in addition to the joint angle of each finger of the operator and the presence/absence of contact with the object OB onto the end effector 10.

Figure 8:
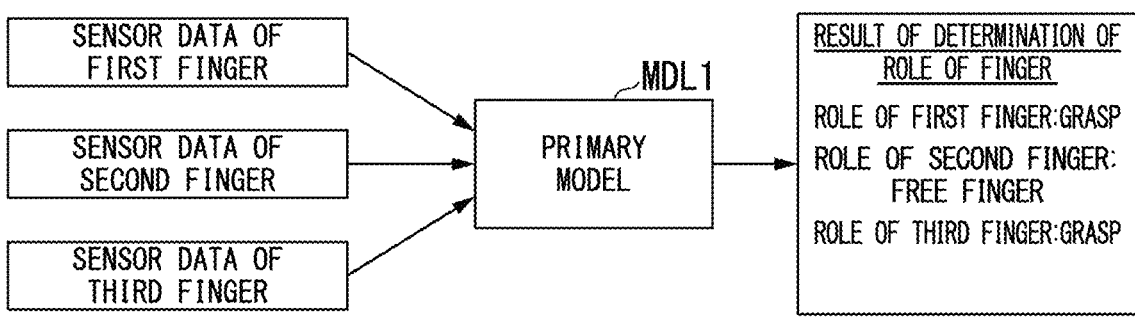
FIG. 8 is a diagram showing a primary model.

FIG. 8 is a diagram showing the primary model MDL1. The primary model MDL1 outputs the role of each finger 11 of the end effector 10 (any one of "grasp", "equilibrium manipulation, "nonequilibrium manipulation", and "free finger") in accordance with an input of sensor data of each finger of the operator (a joint angle of each finger of the operator).

For example, the primary model MDL1 may be a machine learning model that has learned in advance, logics of a human set up in advance (also referred to as a rule-based model), or a combination thereof.

The machine learning model, for example, may be embedded using a neural network. In addition, the machine learning model is not limited to the neural network and may be embedded using another model such as a support vector machine and a decision tree, a Naive Bayes classifier, or a random forest.

In a case in which the machine learning model is embedded using a neural network, for example, coupling information representing a method of coupling units included in an input layer, one or more hidden layers (intermediate layers), and an output layer configuring the neural network, weight information representing a coupling coefficient given to data that is input and output between coupled units, and the like are included.

The coupling information, for example, includes information designating the number of units included in each layer and types of units of a coupling destination of the units and information such as an activation function realizing each unit, a gate disposed between units of the hidden layers, and the like.

The activation function realizing each unit, for example, may be a rectified linear unit (ReLU) function, an exponential linear units (ELU) function, a clipping function, a Sigmoid function, a step function, a hyperbolic tangent function, an identify function, or the like. For example, in accordance with a value (for example, 1 or 0) returned by the activation function, the gate selectively transmits data transferred between units or weights the data.

For example, when data is output from a unit of a certain layer to a unit of a deeper layer in a hidden layer of the neural network, the coupling coefficient includes a weight assigned to output data. In addition, the coupling coefficient may include a bias component and the like that are unique to each layer.

In a case in which the primary model MDL1 is a machine learning model, the machine learning model learns on the basis of a training data set in which a role of a correct answer of each finger 11 of the end effector 10 is labeled with sensor data of each finger of an operator (a joint angle of each finger of an operator).

On the other hand, in a case in which the primary model MDL1 is a logic (a rule-based model), for example, the role of each finger 11 may be determined on the basis of the following conditions.

(First Condition)

In a case in which a joint angle of one finger of interest (hereinafter, referred to as a finger of interest) among a plurality of fingers of an operator is equal to or larger than a first threshold, and an object OB is not brought into contact with the end effector 10, the role of the finger 11 of the end effector 10 corresponding to the finger of interest of the hand of the operator is determined to be the free finger. The finger of interest is an example of "first finger".

(Second Condition)

In a case in which the joint angle of a finger of interest among a plurality of fingers of an operator is smaller than the first threshold, and an object OB is brought into contact with the end effector 10, the role of the finger 11 of the end effector 10 corresponding to the finger of interest of the hand of the operator is determined to be one of the grasp, the equilibrium manipulation, and the nonequilibrium manipulation.

(Third Condition)

Under the second condition, in a case in which the joint angle of the finger of interest is also smaller than a second threshold, the role of the finger 11 of the end effector 10 corresponding to the finger of interest of the hand of the operator is determined to be the grasp.

(Fourth Condition)

Under the second condition, in a case in which the joint angle of the finger of interest is also equal to or larger than the second threshold, and a relative change (an angle difference) between a joint angle of another finger of the operator different from the finger of interest (for example, a finger neighboring to the finger of interest) and a joint angle of the finger of interest is smaller than a third threshold, the role of the finger 11 of the end effector 10 corresponding to the finger of interest of the hand of the operator is determined to be the equilibrium manipulation. The other finger of the operator that is different from the finger of interest (for example, a finger neighboring to the finger of interest) is an example of "second finger".

(Fifth Condition)

Under the second condition, in a case in which the joint angle of the finger of interest is also equal to or larger than the second threshold, and a relative change (an angle difference) between a joint angle of another finger of the operator different from the finger of interest (for example, a finger neighboring to the finger of interest) and a joint angle of the finger of interest is equal to or larger than the third threshold, the role of the finger 11 of the end effector 10 corresponding to the finger of interest of the hand of the operator is determined to be the nonequilibrium manipulation.

The description of the flowchart will be continued. Next, the secondary determination unit 123 re-determines the role of each finger 11 of the end effector 10 from the role of each finger 11 of the end effector 10 and sensor data of the end effector 10 and/or an input device of a glove type using a secondary model MDL2 (Step S104).

Figure 9:
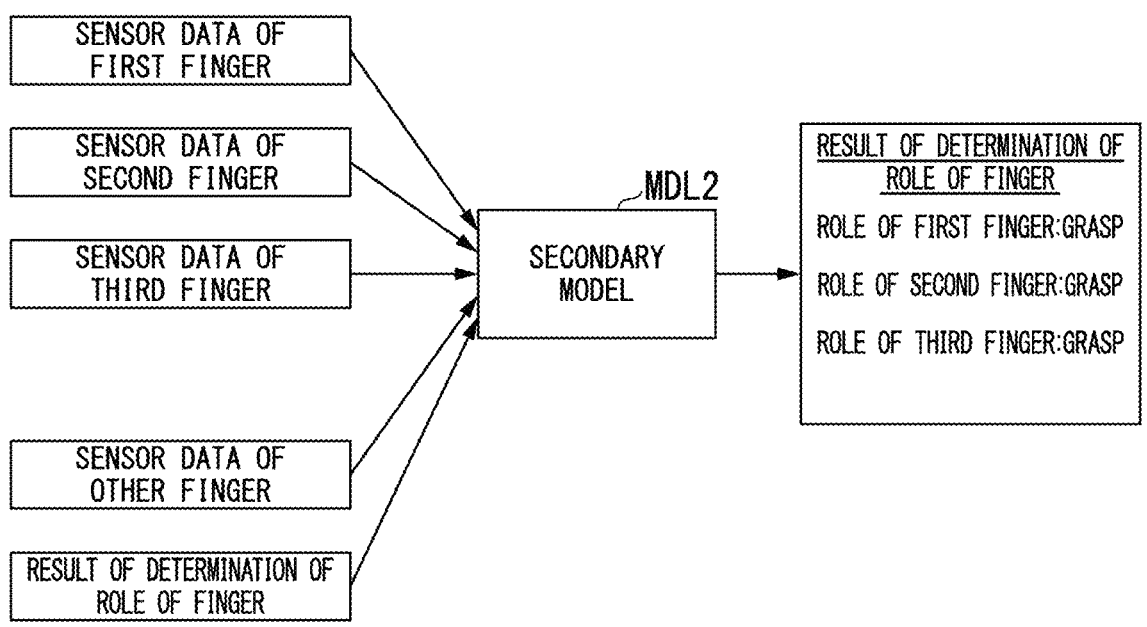
FIG. 9 is a diagram showing a secondary model.

FIG. 9 is a diagram showing the secondary model MDL2. The secondary model MDL2 outputs the role of each finger 11 of the end effector 10 in accordance with inputs of sensor data of each finger of an operator (a joint angle of each finger of the operator), the role of each finger 11 of the end effector 10, and other sensor data (sensor data of a camera and a motion capture sensor).

For example, similar to the primary model MDL1, the secondary model MDL2 may be a machine learning model that has learned in advance, a logic of a human set up in advance (also referred to as a rule-based model), or a combination thereof.

In a case in which the secondary model MDL2 is a machine learning model, the machine learning model learns on the basis of a training data set in which a role of a correct answer of each finger 11 of the end effector 10 is labeled with sensor data of each finger of an operator (a joint angle of each finger of the operator), the role of each finger 11 of the end effector 10, and other sensor data (sensor data of a camera and a motion capture sensor).

In this way, by repeatedly determining the role of each finger 11 of the end effector 10 using the primary model MDL1 and the secondary model MDL2, for example, in a case in which only one finger is determined to be the free finger, and the remaining other fingers are determined to be the grasp due to a sensor noise or the like, the free finger can be changed to the grasp.

The description of the flowchart will be continued. Next, the command generating unit 124 generates a control command for controlling each actuator 14 of the end effector 10 on the basis of the role of each finger 11 of the end effector 10 determined by the secondary determination unit 123 (Step S106).

Next, the communication control unit 125 transmits the control command generated by the command generating unit 124 to the end effector 10 through the communication interface 110 (Step S108). When a control command is received from the operation control device 100, the drive control unit 15 of the end effector 10 controls the actuator 14 on the basis of the control command. In accordance with this, the end effector 10 operates, and a task of grasping or operating an object OB is performed. In accordance with this, the process of this flowchart ends.

According to the embodiment described above, the operation control device 100 can grasp or operate an object OB and acquire sensor data generated when an operator remotely operates the end effector 10 in which the plurality of fingers 11 are disposed using an input device of a globe type. In this sensor data, sensor data of various sensors disposed in the end effector 10 and sensor data of various sensors disposed in the input device of the glove type worn by the hand of the operator are included.

The operation control device 100 determines the role of each of the plurality of fingers 11 of the end effector 10 on the basis of the acquired sensor data. Then, the operation control device 100 generates a control command for controlling each actuator 14 of the end effector 10 on the basis of the role of each of the plurality of fingers 11 of the end effector 10 and the sensor data. By operating the end effector 10 on the basis of the control command generated in this way, the end effector 10 of the robot can be caused to reproduce very diverse tasks (for example, a rotational motion and a translational motion of the object OB) that can be achieved using human hands.

As discussed above, although the form for performing the present invention has been described using the embodiment, the present invention is not limited to such an embodiment at all, and various modifications and substitutions can be made within a range not departing from the concept of the present invention.

What is claimed is:

1. An operation control method comprising:
acquiring sensor data generated when an operator remotely operates an end effector that is configured to grasp or operate an object and in which a plurality of fingers are disposed;
determining a role of each of the plurality of fingers on a basis of the sensor data; and
generating a command for operating the end effector on a basis of the role of each of the plurality of fingers and the sensor data.

2. The operation control method according to claim 1, wherein the roles include:
a first role of grasping the object using a target finger together with other fingers;
a second role of operating the object with a balance of forces of the target finger and the other fingers maintained;
a third role of operating the object by applying a force to the object, which is grasped with a balance of forces maintained using the other fingers, using the target finger; and
a fourth role of not applying a force to the object using the target finger.

3. The operation control method according to claim 2, wherein a value representing a joint angle of each finger of a hand of the operator and a value representing presence/absence of contact of the object with the end effector are included in the sensor data, and
wherein, in a case in which the joint angle of a first finger of interest among fingers of the hand of the operator is equal to or larger than a first threshold used for comparing the joint angle of the first finger of interest, and the object is not brought into contact with the end effector, the role of a finger of the end effector corresponding to the first finger of a hand of the operator is determined to be the fourth role, and in a case in which the joint angle of the first finger is smaller than the first threshold used for comparing the joint angle of the first finger of interest, and the object is brought into contact with the end effector, the role of the finger of the end effector corresponding to the first finger of the hand of the operator is determined to be the first role, the second role, or the third role.

4. The operation control method according to claim 3, wherein, in a case in which a change of the joint angle of the first finger is smaller than a second threshold used for comparing the change of the joint angle of the first finger, the role of the finger of the end effector that corresponds to the first finger of the hand of the operator is determined to be the first role,
wherein, in a case in which a change of the joint angle of the first finger is equal to or larger than the second threshold used for comparing the change of the joint angle of the first finger, and a relative change between the joint angle of a second finger different from the first finger and the joint angle of the first finger is smaller than a third threshold used for comparing the relative change between the joint angle of the second finger and the joint angle of the first finger, the role of the finger of the end effector that corresponds to the first finger of the hand of the operator is determined to be the second role, and
wherein, in a case in which a change of the joint angle of the first finger is equal to or larger than the second threshold used for comparing the change of the joint angle of the first finger, and a relative change between the joint angle of the second finger and the joint angle of the first finger is equal to or larger than the third threshold used for comparing the relative change between the joint angle of the second finger and the joint angle of the first finger, the role of the finger of the end effector that corresponds to the first finger of the hand of the operator is determined to be the third role.

5. The operation control method according to claim 1, wherein the role of each of the plurality of fingers is determined from the sensor data using a machine learning model.

6. The operation control method according to claim 1, wherein a role of each of the of the plurality of fingers is re-determined from the role of each of the plurality of fingers and the sensor data using a machine learning model, and
wherein the command is generated on the basis of the role of each of the plurality of fingers that has been re-determined.

7. An operation control device comprising:
a central processing unit; and
a memory that stores executable instructions that, when executed by the central processing unit, facilitate performance of operations, comprising:
acquiring sensor data generated when an operator remotely operates an end effector that is configured to grasp or operate an object and in which a plurality of fingers are disposed;
determining a role of each of the plurality of fingers on a basis of the sensor data; and generating a command for operating the end effector on a basis of the role of each of the plurality of fingers and the sensor data.

8. A non-transitory storage medium storing commands, which are computer-readable commands to be executed by a computer, comprising:

acquiring sensor data generated when an operator remotely operates an end effector that is configured to grasp or operate an object and in which a plurality of fingers are disposed;

determining a role of each of the plurality of fingers on a basis of the sensor data; and generating a command for operating the end effector on a basis of the role of each of the plurality of fingers and the sensor data.

* * * * *